United States Patent [19]

Ueda et al.

[11] Patent Number: 4,961,118
[45] Date of Patent: Oct. 2, 1990

[54] DOCUMENT SCANNER DRIVEN BY ELECTROMAGNETIC ACTUATORS

[75] Inventors: Takaharu Ueda; Tetsu Yamamoto; Manabu Ogura; Takashi Yumura, all of Hyogo, Japan

[73] Assignee: Mitsubishi Denki Kabushiki Kaisha, Tokyo, Japan

[21] Appl. No.: 265,454

[22] PCT Filed: Mar. 16, 1988

[86] PCT No.: PCT/JP88/00273
§ 371 Date: Mar. 15, 1989
§ 102(e) Date: Mar. 15, 1989

[30] Foreign Application Priority Data

May 29, 1987 [JP] Japan ................................. 62-135456
May 29, 1987 [JP] Japan ................................. 62-135457

[51] Int. Cl.$^5$ ............................................... H04N 1/10
[52] U.S. Cl. ..................................... 358/497; 358/494
[58] Field of Search .................... 358/42, 75, 474, 494, 358/497

[56] References Cited

U.S. PATENT DOCUMENTS 4,651,229 3/1987 Coli ......................................... 358/42
4,792,858 12/1988 Landsman ............................ 358/497
4,841,358 6/1989 Kammoto et al. ..................... 358/75

FOREIGN PATENT DOCUMENTS 0096677 12/1983 European Pat. Off. .
0180350 5/1986 European Pat. Off. .
3014409 10/1980 Fed. Rep. of Germany .
3633316 4/1987 Fed. Rep. of Germany .
58-69173 4/1983 Japan ..................................... 358/497
60-263564 12/1985 Japan ..................................... 358/75
61-4360 1/1986 Japan ..................................... 358/497
61-4362 1/1986 Japan ..................................... 358/497

OTHER PUBLICATIONS

Patent Abstracts of Japan, vol. 10, No. 141 (E–406) [2198], May 24, 1986 (Japanese Kokai 61-4360).
Patent Abstracts of Japan, vol. 6, No. 164 (E–127) [1042], Aug. 27, 1982 (Japanese Kokai 57-84664).

Primary Examiner—James J. Groody
Assistant Examiner—Mark R. Powell
Attorney, Agent, or Firm—Burns, Doane, Swecker & Mathis

[57] ABSTRACT

A two-dimensional image pick-up device using a one-dimensional image pick-up element which is useful as an image reader. Drive coil type linear motors for driving an element moving carriage in the subscanning direction of the one-dimensional image pick-up element are disposed on both sides of the element moving carriage, enabling the deivce to be economically small-sized as a whole.

6 Claims, 7 Drawing Sheets

DOCUMENT SCANNER DRIVEN BY ELECTROMAGNETIC ACTUATORS

TECHNICAL FIELD

The present invention relates to a two-dimensional image pick-up device in which subscanning is mechanically carried out by using a one-dimensional image pick-up element.

BACKGROUND ART

FIG. 7 is a perspective view illustrating a conventional two-dimensional image pick-up device disclosed in the Japanese Laid-Open Patent Publication (unexamined) No. 58-69173, FIG. 8 is an exploded perspective view illustrating an element moving carriage and guide rail of the conventional two-dimensional image pick-up device, and FIG. 9 is a sectional view illustrating that the element moving carriage and the guide rail in FIG. 8 are in an assembled state.

In these drawings, reference numeral 1 indicates a frame of the two-dimensional image pick-up device, numeral 2 indicates the guide rail mounted on the frame 1, and numeral 3 indicates the element moving carriage which is supported on the guide rail 2 through the bearings 4, 5 (see FIGS. 8 and 9) so as to be movable in the direction of the arrows A and B. The one-dimensional image pick-up element (not illustrated) is attached to the element moving carriage 3. Numeral 6 indicates an arm of the element moving carriage 3, numeral 7 indicates a spring for downward partial loading connected to the arm 6, numeral 8 indicates a micrometer head which is disposed beneath the arm 6 and securely fitted to the frame 1 through a fitting member 9. The micrometer head 8 having a spindle 10 connected to the arm 6 comprises a motion converting mechanism 11 of micrometer type which converts an inputted rotary motion to a linear motion in the axial direction of the spindle 10, and a rotary encoder 12 which detects the rotary motion and generates a pulse for each rotary motion of a specified angle, so that the spindle 10 pushes up the arm 6 of the element moving carriage 3 against the spring 7. Numeral 13 indicates an input gear mounted on the rotary input shaft of the micrometer head 8, numeral 14 indicates an electric motor installed in the vicinity of the micrometer head 8, and numeral 15 indicates an output gear engaged with the input gear 13. Numeral 16 indicates an upper side limit switch disposed above the element moving carriage 3, and numeral 17 indicates a lower side limit switch disposed beneath the element moving carriage 3. These upper and lower side limit switches 16 and 17 automatically stop the motor 14 when the element moving carriage 3 moving up and down (in linear motion) reaches a prescribed position and turns the switches on. Numeral 18 indicates an optical system which generates image of an original picture on the focal plane, and numeral 19 indicates a disc carriage for exchanging filters. A red filter 20, a green filter 21, a blue filter 22 and a black-and-white filter 23 are respectively arranged in the filter exchanging carriage 19 with equal distance therebetween. Numeral 24 indicates a filter exchanging electric motor which intermittently drives the filter exchanging carriage 19 rotationally, so that each of red, green, blue and black-and-white filers 20 to 23 is exchanged and comes at the position corresponding to the optical system 18.

A conventional device of above construction operates as follows.

When the motor 14 starting, the rotary input shaft of the motion converting mechanism 11 is rotationally driven through the output gear 15 and the input gear 13, and the rotation is converted to a linear motion by the motion converting mechanism 11 and transmitted to the micrometer head 8, whereby the arm 6 of the element moving carriage 3 starts a linear motion so that the one-dimensional image pick-up element of the element moving carriage 3 is scanned along the guide rail 2. The range of the linear motion of the element moving carriage 3 at the time of scanning is determined by counting pulses from the rotary encoder 12. Further, as the result of intermittent rotational drive of the filter exchanging carriage 19 by means of the filter exchanging motor 24, any one of the red, green, blue and black-and-white filters can alternatively assume a position in the light path behind the position of optical system 18.

Since the conventional two-dimensional image pick-up device is constructed as described above, the element moving carriage 3 and the filter exchanging carriage 19 are individually driven by the two motors 14 and 24 for their respective exclusive use. Moreover, the rotation of the motor 14 is converted to a linear motion and transmitted to the element moving carriage 3, and the micrometer head 8 is required for the subscanning of the element moving carriage 3. Accordingly, a problem exists in that the conventional device is undesirably large-sized as a whole. Besides, since the filter exchanging carriage 19 is of rotary type, the size of the color filters is required to correspond to the subscanning distance of the ōne-dimensional image pick-up element 25 at the time of exchanging the filters, whereby the color filters are also obliged to be large-sized. As a result the filter exchanging carriage 19 itself is also large-sized. This brings about such a drawback as increase in cost.

SUMMARY OF THE INVENTION

The present invention was made to overcome the above-discussed drawback and has an object of providing a novel two-dimensional image pick-up device which is small-sized thereby contributing to reduction in cost.

To accomplish the foregoing object, in the two-dimensional image pick-up device according to the invention, drive coil type linear motors for driving the element moving carriage in the subscanning direction of one-dimensional image pick-up element are disposed on both sides of the element moving carriage on which the one-dimensional image pick-up element is mounted positionally corresponding to the optical system.

In the two-dimensional image pick-up device of the above construction according to the invention, when supplying power to the drive coils of the linear motors, a driving force for moving the element moving carriage is generated in the voice drive coils, and the one-dimensional image pick-up element is subscanned by the movement of the element moving carriage.

DETAILED DESCRIPTION OF PREFERRED EMBODIMENTS

Figure 1:
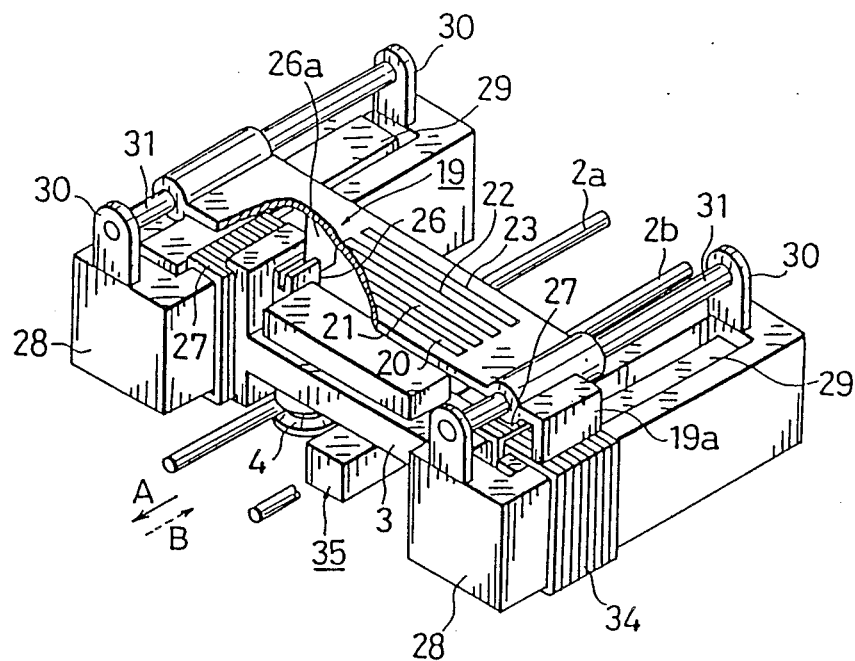
FIG. 1 is a partially sectional perspective view of the two-dimensional image pick-up device according to one embodiment of the present invention.
Figure 2:
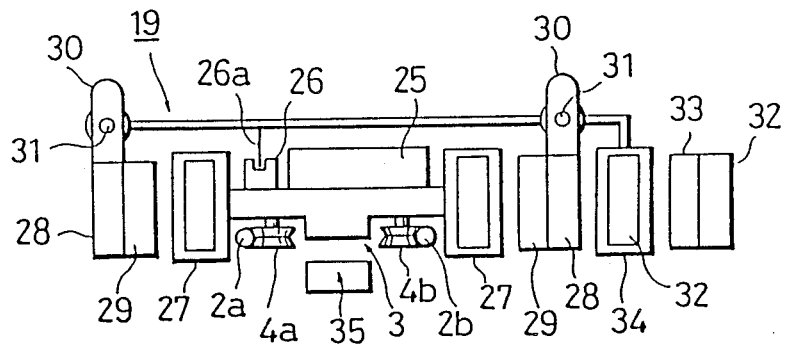
FIG. 2 is a schematic front view of the two-dimensional image pick-up device.
Figure 3:
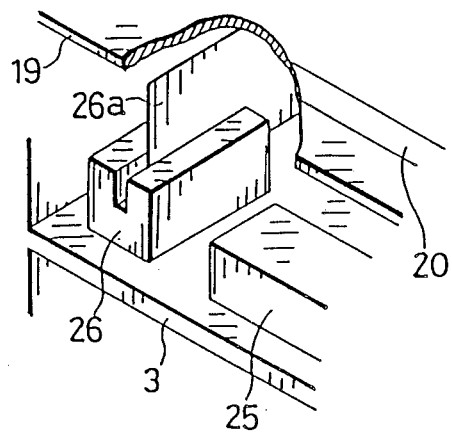
FIG. 3 is a perspective view illustrating relative position detecting means for the element moving carriage and the filter exchanging carriage.
Figure 4:
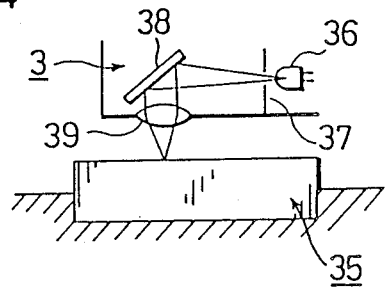
FIG. 4 is a schematic view illustrating the absolute position detecting means for the element moving carriage.
Figure 5:
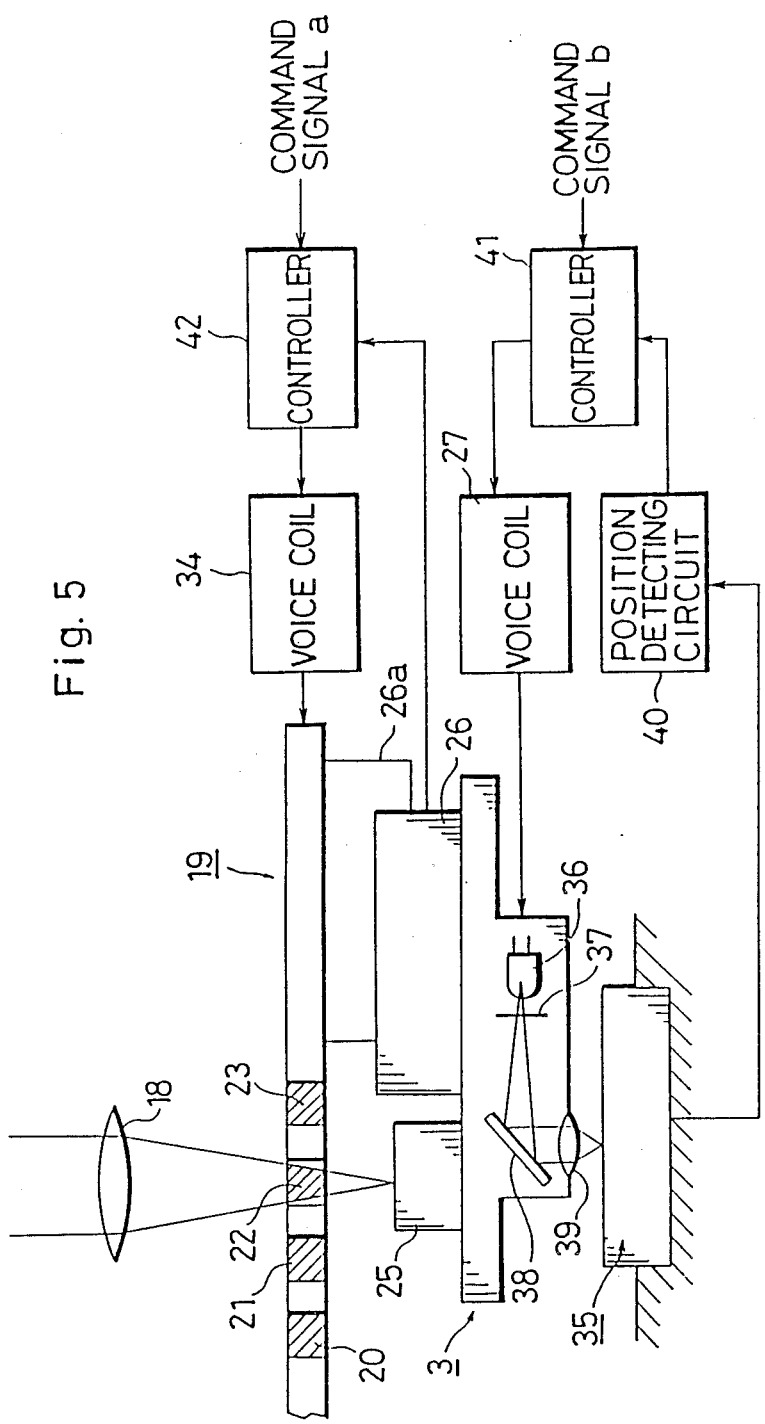
FIG. 5 is a block diagram schematically illustrating the arrangement in FIG. 1.
Figure 7:
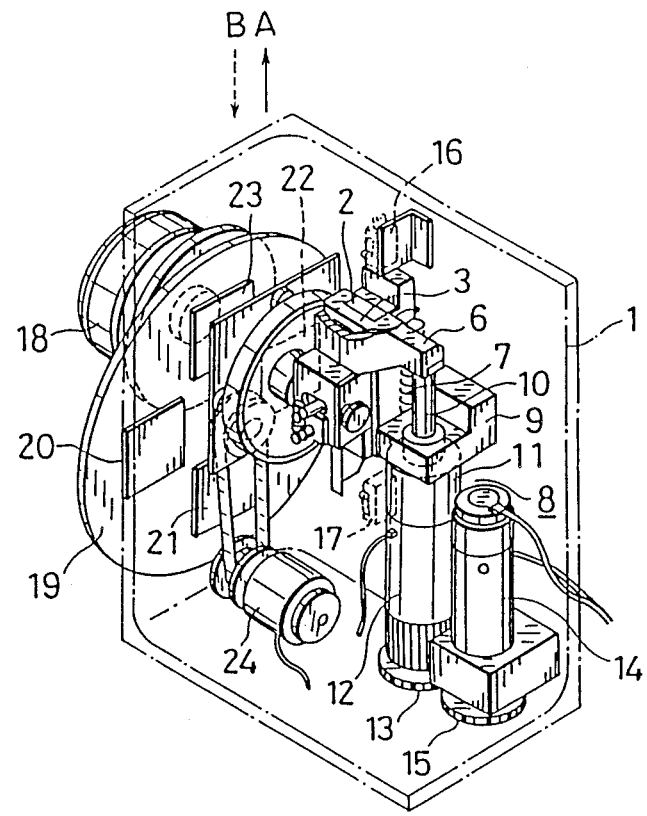
FIG. 7 is a perspective view illustrating a conventional two-dimensional image pick-up device.
Figure 8:
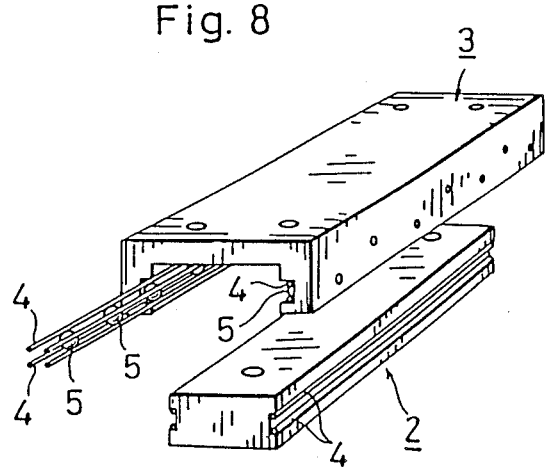
FIG. 8 is an exploded perspective view of the element moving carriage and the guide rail of the conventional two-dimensional image pick-up device.
Figure 9:
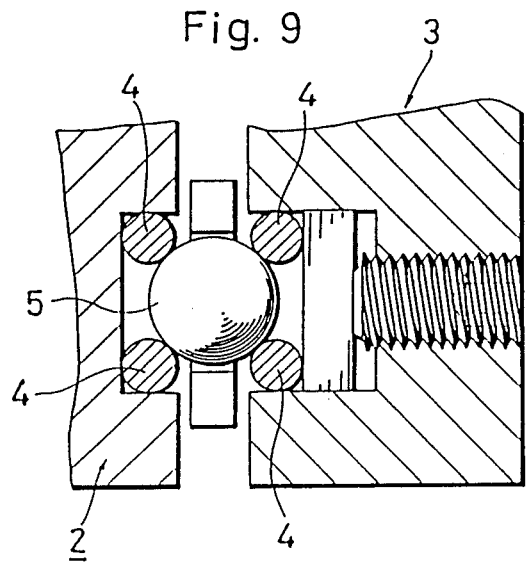
FIG. 9 is a sectional view illustrating that the carriage and the guide rail in FIG. 8 are in the assembled state.

An embodiment of the present invention is now described with reference to the accompanying drawings, in which FIG. 1 is a partially sectional perspective view of the two-dimensional image pick-up device according to one embodiment of the present invention; FIG. 2 is a schematic front view of the two-dimensional image pick-up device; FIG. 3 is a perspective view illustrating the relative position detecting means for the element moving carriage and the filter exchanging carriage; FIG. 4 is a schematic view illustrating the absolute position detecting means for the element moving carriage; FIG. 5 is a block diagram schematically illustrating the arrangement in FIG. 1; and in which like reference numerals are designated to the same or like parts as FIGS. 7 to 9 to omit repeated description.

In the drawings, numerals 2a, 2b indicate guide rails comprising a pair of round bars disposed at positions parallel to each other, and the element moving carriage 3 is movably supported on the guide rails 2a, 2b through the bearings 4a, 4b (see FIGS. 1 and 2). Numeral 19 indicates a plate-like filter exchanging carriage which is disposed between the element moving carriage 3 and the optical system 18 (see FIG. 5) and driven in the safe direction as the element moving carriage 3 in parallel thereto. The filter exchanging carriage 19 is mounted with red filter 20, green filter 21, blue filter 22 and black-and-white filter 23, each arranged at a certain distance therebetween in the direction of width the of the filter exchanging carriage 19. Numeral 25 indicates one-dimensional image pick-up element mounted on the element moving carriage 3 to be subscanned, and numeral 26 indicates relative position detecting means mounted on the element moving carriage together with the one-dimensional image pick-up element 25 for detecting a relative position between the element moving carriage 3 and the filter exchanging carriage 19. Numeral 26a indicates a detecting fin of the relative position detecting means 26, which is attached to the filter exchanging carriage 19. Numeral 27 indicates drive coils fixed to both ends of the element moving carriage 3, numeral 28 indicates yokes of magnetic circuits each forming a drive source of the element moving carriage 3, and which are arranged on both ends of the element moving carriage 3, and numeral 29 indicates permanent magnets respectively fixed to the yokes 28. The permanent magnets 29 and the drive coils 27 form linear motors M1 which drive the element moving carriage 3 in the subscanning direction of the one-dimensional image pick-up element 25. Numeral 30 indicates rail supporting members respectively provided on the yokes 28, and numeral 31 indicates guide rails each comprising a round bar supported by the rail supporting member 30. Both end portions of the filter exchanging carriage 19 are movably supported by the guide rails 31. Numeral 34 indicates a drive coil which is wounded around the yoke 28 of one of the magnetic circuits serving as a drive source of the element moving carriage 3 and crosses over the magnetic field of the permanent magnet 29, thus forming a part of the linear motor M1 to drive the filter exchanging carriage 19. Numeral 35 indicates an optical sensor serving as the absolute position detecting means for detecting the absolute position of the element moving carriage 3 with respect to the stationary side. The optical sensor 35 is provided with a light source 36 such as a light emitting diode attached to the element moving carriage 3 side, a diaphragm plate 37 arranged in front of the light source 36 and having an aperture for restricting light from the light source 36, a reflecting mirror 38 and a lens 39 both arranged in front of the light source 36, as illustrated in FIGS. 4 and 5. Numeral 40 indicates a position detecting circuit for detecting the absolute position of the element moving carriage 3, and numeral 41 indicates a controller to which an absolute position detecting signal and a command signal b from the position detecting circuit 40 are inputted, and from which a control current obtained as the result of comparison of the signals is sent to the drive coils 27 of the element moving carriage 3. Numeral 42 indicates a controller to which an input signal and a command signal "a" from the relative position detecting means 26 are inputted and compared, and from which a control current corresponding to the value obtained by the comparison is supplied to the voice coil 34 of the filter exchanging carriage 19.

The device of the above arrangement operates as follows.

When the current is supplied from the controller 41 to the drive coils 27 of the element moving carriage 3 located in the magnetic field of the permanent magnets 29, a driving force for driving the element moving carriage 3 is generated in the drive coils 27 in the direction of the arrow A (or arrow B) in FIG. 1, and, by this driving force, the element moving carriage 3 moves in the direction A (or B) and subscans the one-dimensional image pick-up element 25. When light from the light source 36 is detected by the optical sensor 35 through the diaphragm plate 37, reflecting mirror 38 and lens 39 at the time of subscanning, the detected signal is inputted to the position detecting circuit 40 which detects the absolute position of the element moving carriage 3, and this detected signal is then inputted to the controller 41, whereby the controller 41 compares the input signal from the position detecting circuit 40 with the command signal b and determines a quantity of current to be supplied to the drive coils 27 so that the current corresponding to the determined quantity is supplied thereto. In this manner, the element moving carriage 3 moves in the subscanning direction by a distance which corresponds to the quantity of current determined based on the command signal "b", thus positioning the one-dimensional image pick-up element 25 in the subscanning direction.

In the filter exchanging carriage 19, when a current is supplied from the controller 41 (see FIG. 4) to the drive coil 34 for exchanging the color filters located in the magnetic field of the magnetic circuits 28, a force generated in the drive coil 34 serves as a driving force for the filter exchanging carriage 19, whereby the carriage 19 moves in the subscanning direction to place the proper color filter 20 to 23 in the light path. In this manner, the magnetic circuits 28 perform a function of driving both element moving carriage 3 and filter exchanging carriage 19. In addition, likewise in the filter exchanging carriage 19, the controller 42 compares the input signal from the relative position detecting means 26 with the command signal "a" and determines a quantity of current to be supplied to the drive coil 34, so that a relative positional relation between the filter exchanging carriage 19 and the element moving carriage 3 is controlled by the command signal "a" which corresponds to the determined quantity of current, eventually selecting the color filters 20 to 23. When the element carriage 3 is scanned in accordance with the command signal "b", a current is supplied to the drive coil 34 so as to keep a relative positional relation controlled by the command signal "a", whereby the element moving carriage 3 and the filter exchanging carriage 19 are held at their appropriate relative position.

In effect, the absolute position of the element moving carriage 3 is detected by the optical sensor 35 without contact, and a relative position between the element moving carriage 3 and the filter exchanging carriage 19 is detected by the relative position detecting means 26, whereby the filter exchanging carriage 19 is controlled by the controller 42 in the system, making it possible to carry out accurately the positioning of the element moving carriage 3 and the subscanning.

Figure 6:
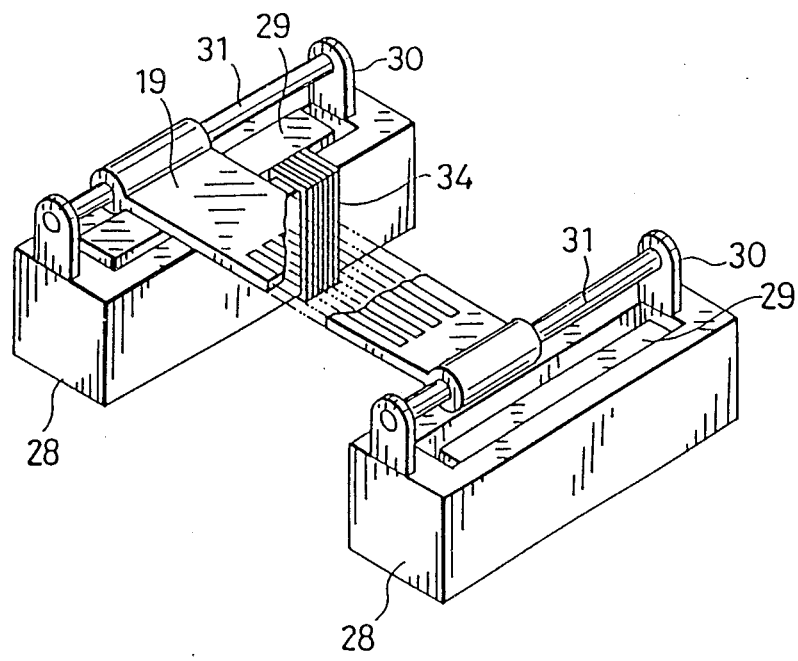
FIGS. 6 and 10 are perspective views illustrating further embodiments.

FIG. 6 illustrates another embodiment of the invention, in which the drive coil 34 for color filter exchange is so arranged as to cross over the magnetic field of the element driving magnetic circuit 28 on the opposite side of that in FIG. 1. Other arrangements and functions remain the same as in the foregoing embodiment.

In addition, the drive coil 34 for color filter exchange can be wound around each yoke of the magnetic circuits 28 on both sides, in which case the filter exchanging carriage 19 is driven on both sides allowing the same to be driven more smoothly.

Figure 10:
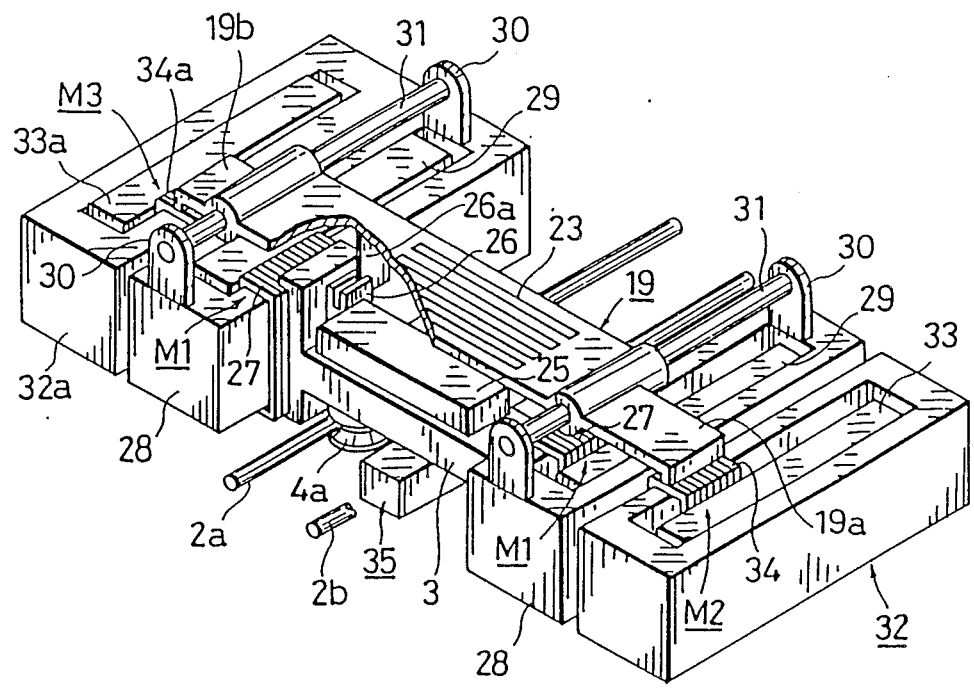

FIG. 10 illustrates a further embodiment, in which another linear motor M3 for exclusive use in connection with color filter exchange is additionally disposed on the opposite side of the linear motor M2 for exclusive use in connection with color filter exchange in the foregoing embodiment, so that the filter exchanging carriage 19 is driven by these two linear motors M2, M3 both for exclusive use in connection with color filter exchange. Accordingly the driving of the filter exchanging carriage 19 can be carried out even more smoothly. The additional linear motor M3 comprises a permanent magnet 33a provided in the yoke 32a of the magnetic circuit of the system, and a drive coil 34a which is attached to the arm 19b on the opposite side of the arm 19a of the filter exchanging carriage 19 in such a manner as to cross the permanent magnet 33, eventually resulting in the same design as the linear motor M2 on the opposite side.

It is also preferred that a PSD (position sensing device) is adopted in place of the optical sensor 35 in the foregoing embodiment.

As has been described so far, since drive coil type linear motors are adopted as drive source for subscanning the one-dimensional image pick-up element in the present invention, an advantage is achieved such that the entire device can be small-sized resulting in reduction of cost.

The present invention can be utilized as an image reader used as a peripheral device for a computer.

What is claimed is:

1. A two-dimensional image pick-up device comprising:
    an optical system for producing an image;
    a one-dimensional image pick-up element, arranged to receive at least part of said image, for scanning said at least part of said image in a main scanning direction;
    an element moving carriage on which said one-dimensional image pick-up element is mounted;
    first and second linear motors, respectively disposed on either side in said main scanning direction of said element moving carriage, each having a stationary magnetic circuit element disposed in a subscanning direction orthogonal to said main scanning direction and a movable coil coiled around said magnetic circuit element, for moving said element moving carriage linearly in said subscanning direction in response to application of an electric current to said movable coil.

2. A two-dimensional image pick-up device according to claim 1, further comprising:
    a filter exchanging carriage provided with a plurality of color filters and supported between said optical system and said one-dimensional image pick-up element so as to be movable in said subscanning direction;
    filter exchanging carriage guide means which guides said filter exchanging carriage in said subscanning direction; and
    a filter exchanging movable coil which is attached to said filter exchanging carriage and coiled around said magnetic circuit element.

3. A two-dimensional image pick-up device according to claim 1, further comprising:
    a filter exchanging carriage provided with a plurality of color filters and supported between said optical system and said one-dimensional image pick-up element so as to be movable in said subscanning direction;
    a filter exchanging carriage guide means which guides said filter exchanging carriage in said subscanning direction; and
    a filter exchanging linear motor respectively disposed on both sides of said filter exchanging carriage, each motor having a filter exchanging magnetic circuit element disposed along said subscanning direction and having a filter exchanging movable coil attached to said filter exchanging carriage and coiled around said filter exchanging magnetic circuit element.

4. A two-dimensional image pick-up device according to claim 2 or claim 3, further comprising:
    relative positive detecting means which detects a position of said filter exchanging carriage with respect to said element moving carriage.

5. A two-dimensional image pick-up device according to claim 4, further comprising:
    absolute position detecting means which detects a position of said element moving carriage with respect to said stationary magnetic circuit element.

6. A two-dimensional image pick-up device according to claim 5, wherein said relative position detecting means is attached to said element moving carriage and detects the position of said filter exchanging carriage by means of detecting a fin attached to said filter exchanging carriage, and said absolute position detecting means comprises a light source attached to said element moving carriage and a fixed optical sensor detecting the light from said light source.

* * * * *